(12) United States Patent
Hwang et al.

(10) Patent No.: US 11,137,051 B2
(45) Date of Patent: Oct. 5, 2021

(54) DIFFERENTIAL APPARATUS FOR A VEHICLE

(71) Applicants: HYUNDAI MOTOR COMPANY, Seoul (KR); KIA MOTORS CORPORATION, Seoul (KR)

(72) Inventors: Jinyoung Hwang, Yongin-si (KR); Jong Sool Park, Seongnam-si (KR); Jong Soo Kim, Seoul (KR); Sang Bum Baek, Seoul (KR); Jin Ho Kim, Suwon-si (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 0 days.

(21) Appl. No.: 16/737,097

(22) Filed: Jan. 8, 2020

(65) Prior Publication Data
US 2021/0116005 A1    Apr. 22, 2021

(30) Foreign Application Priority Data
Oct. 21, 2019 (KR) .......................... 10-2019-0130337

(51) Int. Cl.
*F16H 3/60* (2006.01)
*F16H 3/66* (2006.01)
*F16H 57/08* (2006.01)
*F16H 48/11* (2012.01)

(52) U.S. Cl.
CPC ............. *F16H 3/666* (2013.01); *F16H 48/11* (2013.01); *F16H 57/082* (2013.01)

(58) Field of Classification Search
CPC ......... F16H 48/11; F16H 3/666; F16H 57/082
See application file for complete search history.

(56) References Cited

U.S. PATENT DOCUMENTS 8,480,532 B2 * 7/2013 Biermann ............... F16H 48/11
                                                        475/252

FOREIGN PATENT DOCUMENTS

| EP | 130806 A2 | 9/1985 | |
|---|---|---|---|
| KR | 10-1347493 A | 10/2011 | |
| WO | 1992-012361 A1 | 7/1992 | |
| WO | WO-9212361 A1 * | 7/1992 | ............. F16H 48/10 |
| WO | 2011-003747 A2 | 1/2011 | |

* cited by examiner

*Primary Examiner* — Derek D Knight

(57) ABSTRACT

An exemplary differential apparatus for a vehicle includes: a compound planetary gear set and a planet carrier. In particular, the compound planetary gear set is formed as a combination of first and second planetary gear sets, the first planetary gear set is formed as a single pinion planetary gear set having a first sun gear and a plurality of first pinion gears, and the second planetary gear set is formed as a double pinion planetary gear having a second sun gear disposed coaxially and in parallel with the first sun gear, the plurality of first pinion gears shared with the first planetary gear set, and a plurality of second pinion gears. The planet carrier has an exterior circumference connected to an external gear and is connected to first and second pinion shafts that rotatably support the first and second pinion gears of the second planetary gear set.

7 Claims, 6 Drawing Sheets

DIFFERENTIAL APPARATUS FOR A VEHICLE

CROSS-REFERENCE TO RELATED APPLICATION

This application claims priority to and the benefit of Korean Patent Application No. 10-2019-0130337, filed on Oct. 21, 2019, the entire contents of which are incorporated herein by reference.

FIELD

The present disclosure relates to a differential apparatus for a vehicle.

BACKGROUND

The statements in this section merely provide background information related to the present disclosure and may not constitute prior art.

Environment-friendly technology in vehicles is a core technology of a future automobile industry, and automakers are focusing on developing environment-friendly vehicles to comply with environmental and fuel efficiency regulations.

As such, technology of the drive system for improving the fuel efficiency and reducing an overall weight is continuously being developed.

We have discovered that since a differential apparatus for a vehicle typically employs a bevel gear type, it has disadvantages due to the intrinsic characteristic (e.g., a heavy weight, a lengthy size) of the bevel gear.

The above information disclosed in this Background section is only for enhancement of understanding of the background of the present disclosure and therefore it may contain information that does not form the prior art that is already known to a person of ordinary skill in the art.

SUMMARY

An exemplary differential apparatus for a vehicle includes: a compound planetary gear set and a planet carrier. The compound planetary gear set may be formed as a combination of first and second planetary gear sets, where the first planetary gear set may be formed as a single pinion planetary gear set having a first sun gear and a plurality of first pinion gears, and the second planetary gear set may be formed as a double pinion planetary gear having a second sun gear disposed coaxially and in parallel with the first sun gear, the plurality of first pinion gears shared with the first planetary gear set, and a plurality of second pinion gears. The planet carrier may be connected to first and second pinion shafts that rotatably support the first and second pinion gears of the second planetary gear set and may have an exterior circumference connected to an external gear to receive a driving torque.

The first and second sun gears may have different exterior diameters.

In one form, the plurality of first pinion gears may be externally gear-meshed with the first sun gear of the first planetary gear set. Each of the plurality of second pinion gears may be externally gear-meshed with adjacent two first pinion gears among the plurality of first pinion gears, and at the same time, may be externally gear-meshed with the second sun gear.

Each of the plurality of first pinion gears may include a large diameter gear portion externally gear-meshed with the first sun gear and a small diameter gear portion externally gear-meshed with the second pinion gear.

In one form, the plurality of first pinion gears may be provided as three first pinion gears, and the plurality of second pinion gears may be provided as three second pinion gears. The plurality of first pinion gears may be provided as four first pinion gears, and the plurality of second pinion gears may be provided as four second pinion gears. The plurality of first pinion gears may be provided as five first pinion gears, and the plurality of second pinion gears may be provided as five second pinion gears. The plurality of first pinion gears may be provided as six first pinion gears, and the plurality of second pinion gears may be provided as six second pinion gears.

A first driveshaft may be connected to a rotation center of the first sun gear along a first direction, and a second driveshaft may be connected to a rotation center of the second sun gear along a second direction opposite to the first direction.

According to an exemplary differential apparatus for a vehicle, for a forward and/or rearward driving of an electric vehicle and an ordinary internal combustion engine vehicle, a compound planetary gear set is formed as a combination of first and second planetary gear sets sharing a plurality of first pinion gears and a planet carrier where each of second pinion gears of the second planetary gear set is externally gear-meshed with two adjacent first pinion gears. Therefore, power delivery efficiency and durability may be improved, and at the same time, an overall size may be reduced.

Particularly, in the second planetary gear set, forces applied between the first and second pinion gears at engagement points may be cancelled, thereby reducing an overall force applied to the first and second pinion shafts. Therefore, power delivery efficiency and durability may be improved.

According to an exemplary differential apparatus for a vehicle, the first and second pinion gears PG1 and PG2 of the second planetary gear set PGS2 symmetrically act, and may provide the same advantage of increased power delivery efficiency and durability in the rearward driving condition. Since the first pinion gears and the planet carrier are shared, an overall size may be reduced.

In addition, other effects, which may be obtained or expected by the exemplary forms of the present disclosure, will be directly or implicitly disclosed in the detailed description of the forms of the present disclosure.

Further areas of applicability will become apparent from the description provided herein. It should be understood that the description and specific examples are intended for purposes of illustration only and are not intended to limit the scope of the present disclosure.

DRAWINGS

In order that the disclosure may be well understood, there will now be described various forms thereof, given by way of example, reference being made to the accompanying drawings, in which.

Figure 1:
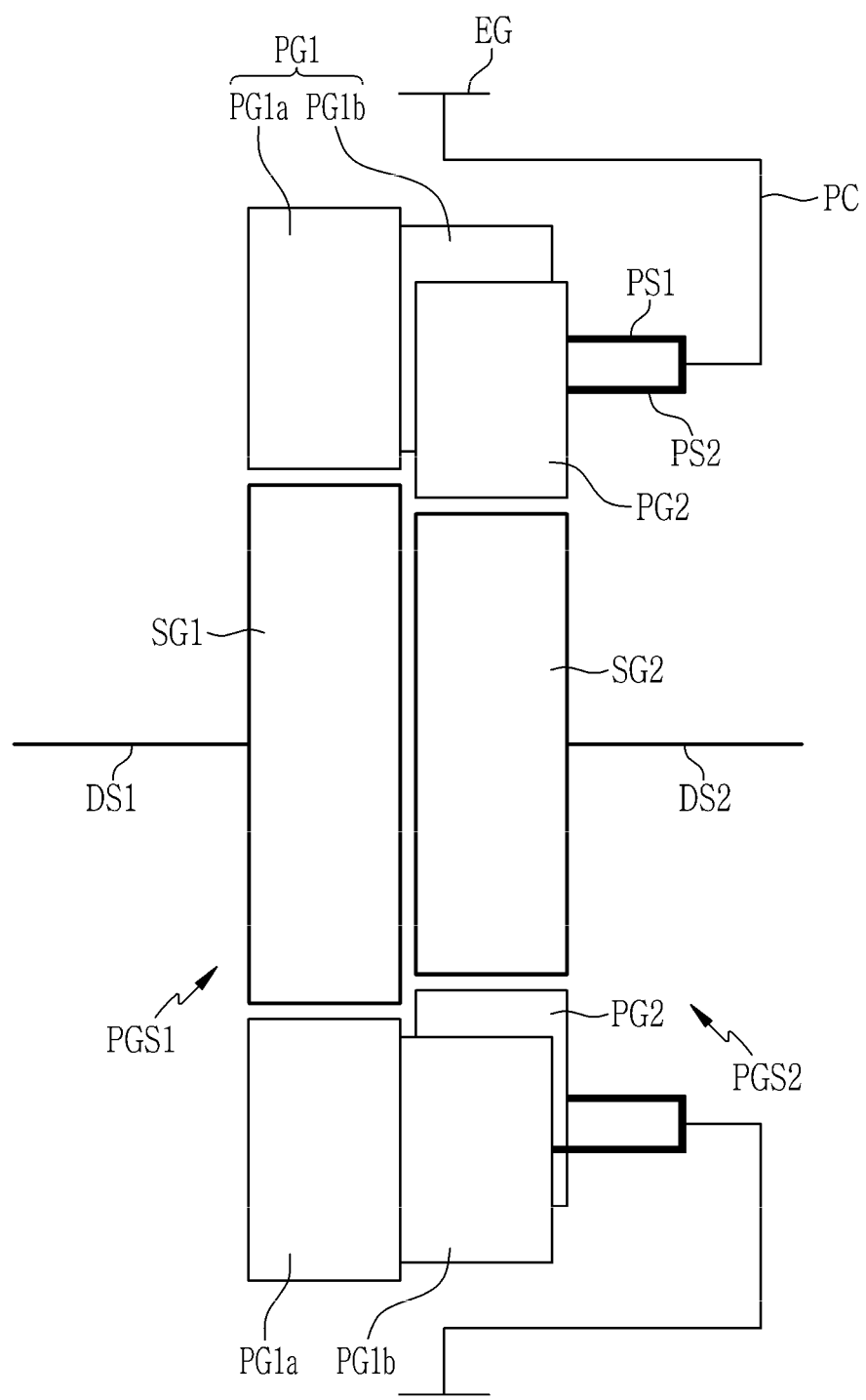
FIG. 1 is a schematic view of an exemplary differential apparatus for a vehicle.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

The present disclosure will be described more fully hereinafter with reference to the accompanying drawings, in which exemplary forms of the present disclosure are shown. As those skilled in the art would realize, the described forms may be modified in various different ways, all without departing from the spirit or scope of the present disclosure.

The drawings and description are to be regarded as illustrative in nature and not restrictive, and like reference numerals designate like elements throughout the specification.

In the following description, dividing names of components into first, second and the like is to divide the names because the names of the components are the same as each other and an order thereof is not particularly limited.

FIG. 1 is a schematic view of an exemplary differential apparatus for a vehicle in one form of the present disclosure.

Referring to FIG. 1, an exemplary differential apparatus for a vehicle differentially outputs a torque of a power source, and includes compound planetary gear set formed as a combination of first and second planetary gear sets PGS1 and PGS2 that share a plurality of first pinion gears PG1, without employing a ring gear.

In the compound planetary gear set, the first planetary gear set PGS1 is formed as a single pinion planetary gear set having a first sun gear SG1 and the plurality of first pinion gears PG1, and the second planetary gear set PGS2 is formed as a double pinion planetary gear having a second sun gear SG2, the plurality of first pinion gears PG1 shared with the first planetary gear set PGS1, and a plurality of second pinion gears PG2.

The first sun gear SG1 is disposed at a rotation center of the first planetary gear set PGS1, and the plurality of first pinion gears PG1 are provided as five first pinion gears PG1 externally gear-meshed with the first sun gear SG1.

The second sun gear SG2 is disposed at a rotation center of the second planetary gear set PGS2. While the plurality of first pinion gears PG1 are shared by the second planetary gear set PGS2, the plurality of second pinion gears PG2 are provided as five second pinion gears PG2 that are externally gear-meshed with the plurality of first pinion gears PG1 and externally gear-meshed with the second sun gear SG2.

The first and second sun gears SG1 and SG2 are disposed coaxially and in parallel, having different exterior diameters.

In such a compound planetary gear set, a first driveshaft DS1 is connected to the rotation center of the first sun gear SG1 along a first direction, e.g. to the left in the drawing, and a second driveshaft DS2 is connected to the rotation center of the second sun gear SG2 along a second direction opposite to the first direction, e.g. to the right in the drawing. The first and second driveshaft DS1 and DS2 may operate separately.

In addition, the first and second planetary gear sets PGS1 and PGS2 shares a planet carrier PC. The planet carrier PC is connected to first and second pinion shafts PS1 and PS2 that rotatably support first and second pinion gears PG1 and PG2 of the second planetary gear set PGS2, respectively. Thus, the first and second pinion gears PG1 and PG2 may rotate about the first and second pinion shafts PS1 and PS2, respectively, while the first and second pinion shafts PS1 and PS2 rotate with the planet carrier PC.

In addition, an external gear EG is formed at an exterior circumference of the planet carrier PC to receive a driving torque.

As described above, the second planetary gear set PGS2 shares the five first pinion gears PG1 externally gear-meshed with the first sun gears SG1 of the first planetary gear set PGS1. Each of the five second pinion gears PG2 is externally gear-meshed with adjacent two first pinion gears PG1 among the five first pinion gears PG1, and at the same time, each of the five second pinion gears PG2 is externally gear-meshed with the second sun gear SG2.

Each of the five first pinion gears PG1 is formed as a step gear that includes a large diameter gear portion PG1a externally gear-meshed with the first sun gear SG1 and a small diameter gear portion PG1b externally gear-meshed with the second pinion gear PG2.

Figure 2:
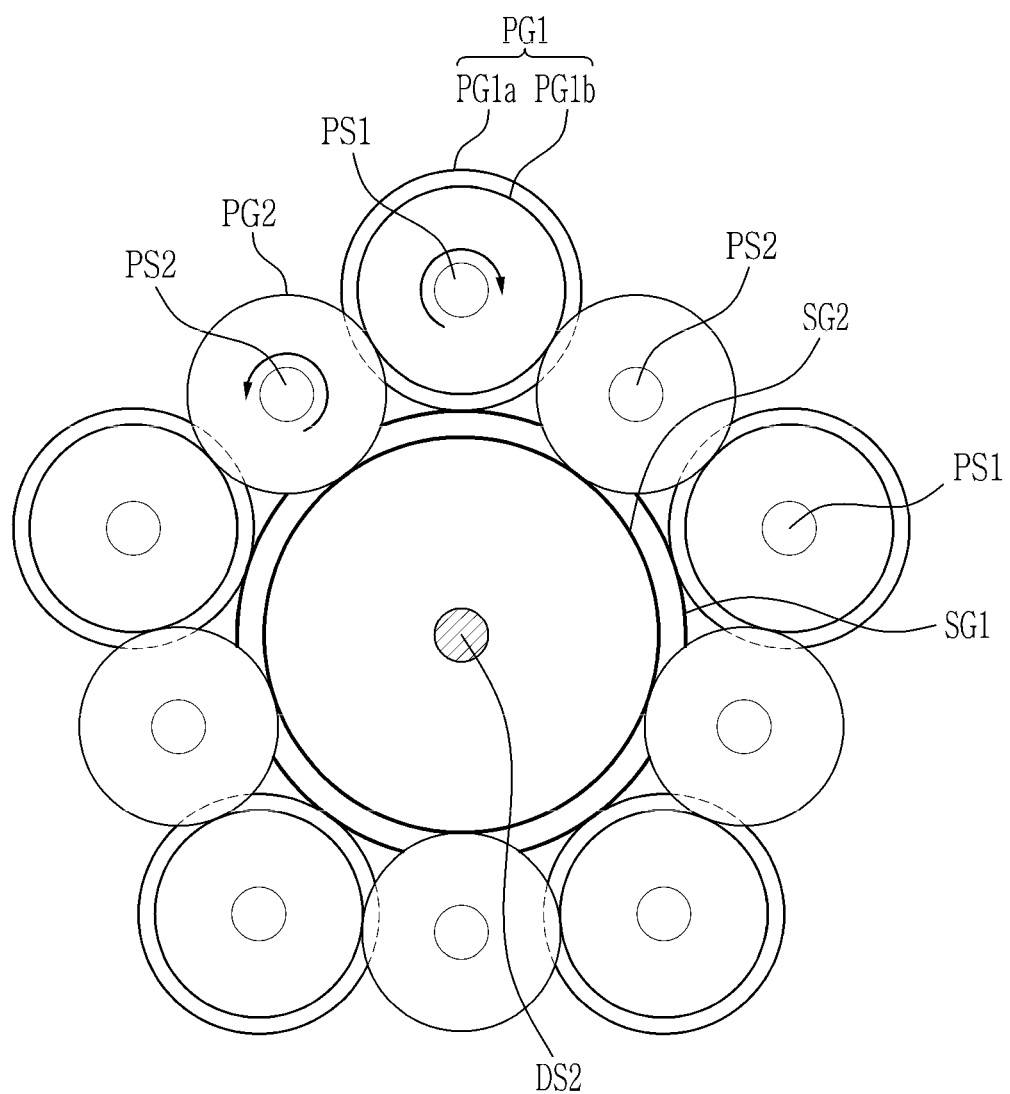
FIG. 2 is a schematic diagram of a planetary gear set applied to an exemplary differential apparatus for a vehicle.

FIG. 2 is a schematic diagram of a planetary gear set applied to an exemplary differential apparatus for a vehicle.

Figure 4:
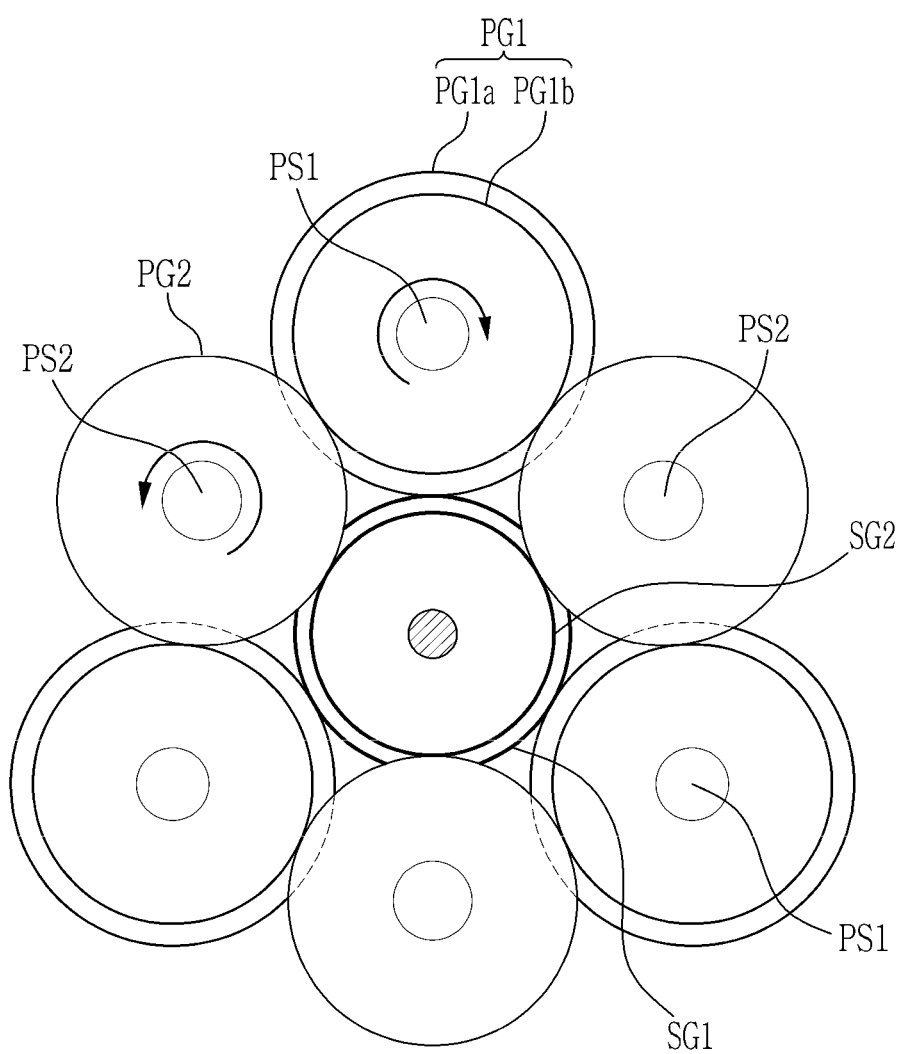
FIG. 4 is a schematic diagram illustrating another form of a planetary gear set applied to an exemplary differential apparatus for a vehicle.
Figure 5:
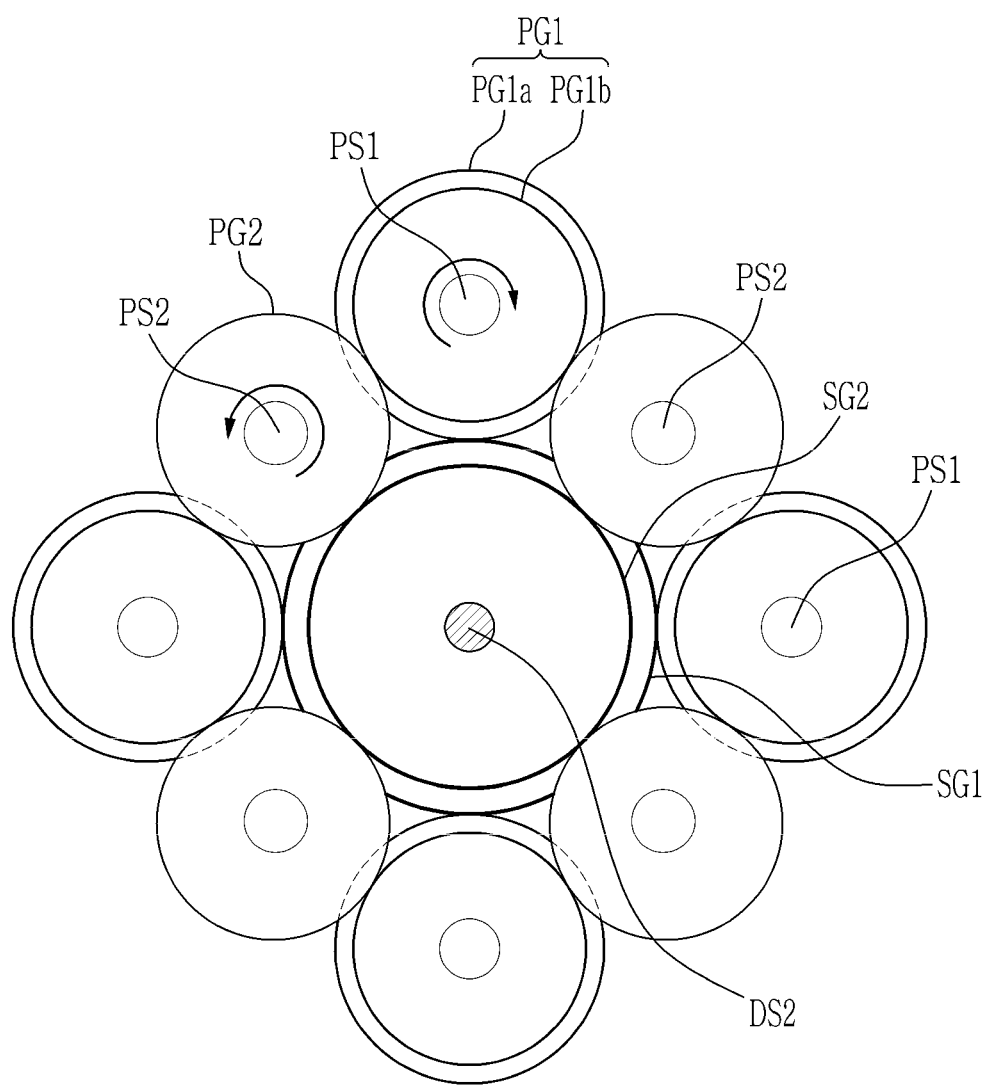
FIG. 5 is a schematic diagram illustrating another form of a planetary gear set applied to an exemplary differential apparatus for a vehicle.
Figure 6:
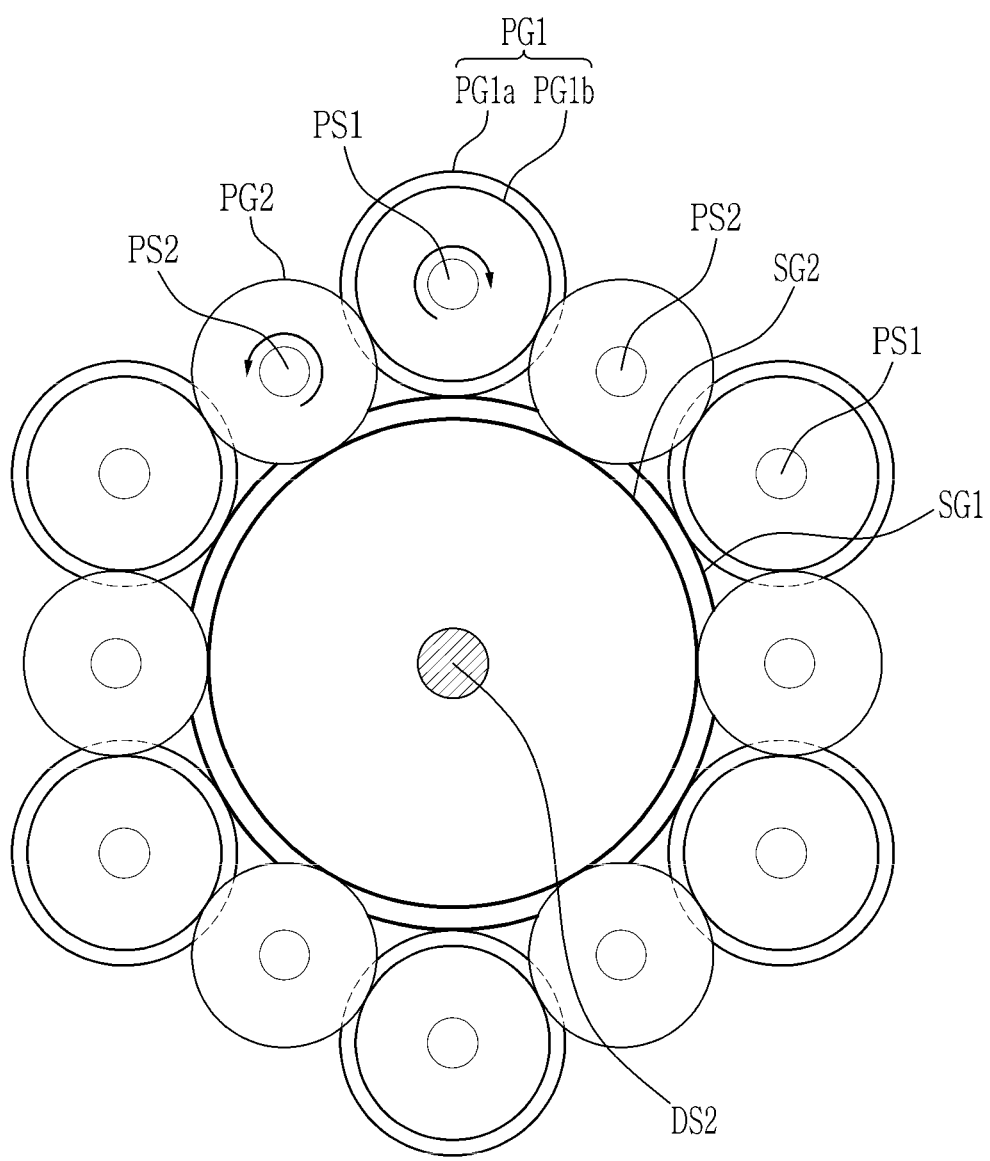
FIG. 6 is a schematic diagram illustrating other form of a planetary gear set applied to an exemplary differential apparatus for a vehicle.

Referring to FIG. 2, although the second planetary gear set PGS2 has been described in connection with an example having five first pinion gears PG1 and five second pinion gears PG2, the present disclosure is not limited thereto. It may be understood that the numbers of the first and second pinion gears PG1 and PG2 may be any other value, e.g., three (3), four (4), or six (6), as respectively illustrated in FIG. 4, FIG. 5, and FIG. 6, if such suffices the condition that each of the second pinion gears PG2 is externally gear-meshed with two adjacent first pinion gears PG1 and at the same time is externally gear-meshed with the second sun gear SG2.

It may be understood that the first drive shaft DS1 and the second drive shaft DS2 may have the same speed or different speeds depending on driving circumstances, for example, straight or curved road, while a torque of a power source is input to the external gear EG connected to the planet carrier PC and thus the planet carrier PC is rotating at a speed given by the power source.

Figure 3:
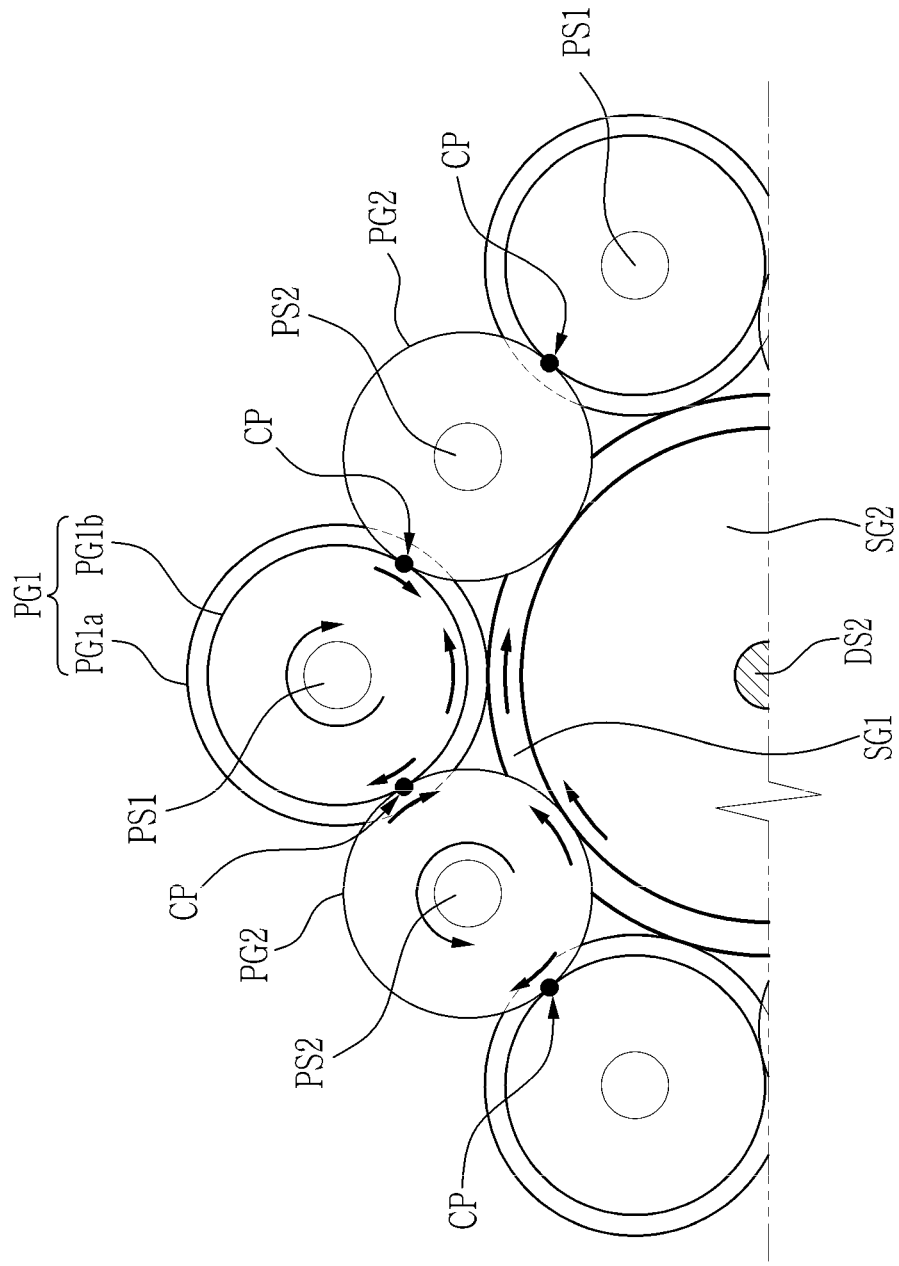
FIG. 3 illustrates a force distribution applied to first and second pinion gears of a planetary gear set applied to an exemplary differential apparatus for a vehicle.

FIG. 3 illustrates a force distribution applied to first and second pinion gears of a planetary gear set applied to an exemplary differential apparatus for a vehicle.

According to an exemplary differential apparatus for a vehicle, for a forward and/or rearward driving of an electric vehicle and an ordinary internal combustion engine vehicle, a compound planetary gear set is formed as a combination of first and second planetary gear sets PGS1 and PGS2 sharing a plurality of first pinion gears PG1 and a planet carrier PC where each of second pinion gears PG2 of the second planetary gear set PGS2 is externally gear-meshed with two adjacent first pinion gears PG1.

Therefore, in the second planetary gear set PGS2, forces $F_1$ applied between the first and second pinion gears at engagement points CP may be cancelled, thereby reducing an overall force applied to the first and second pinion shafts PS1 and PS2.

According to an exemplary differential apparatus for a vehicle, the first and second pinion gears PG1 and PG2 of the second planetary gear set PGS2 symmetrically act, and may provide the same advantage of increased power delivery efficiency and durability in the rearward driving condition.

According to an exemplary differential apparatus for a vehicle, the first pinion gears PG1 and the planet carrier PC are shared between the first and second planetary gear sets without employing a ring gear at the compound planetary gear set, thereby reducing an overall size of the differential apparatus.

While this present disclosure has been described in connection with what is presently considered to be practical exemplary forms, it is to be understood that the present disclosure is not limited to the disclosed forms. On the contrary, it is intended to cover various modifications and equivalent arrangements included within the spirit and scope of the present disclosure.

DESCRIPTION OF SYMBOLS

PGS1, PGS2: first and second planetary gear sets
SG1, SG2: first and second sun gears
PG1, PG2: first and second pinion gears
PS1, PS2: first and second pinion shafts
DS1, DS2: left and second drive shafts
CP: engagement point
PC: planet carrier
EG: external gear

What is claimed is:

1. A differential apparatus for a vehicle, comprising:
a compound planetary gear set formed as a combination of a first planetary gear set and a second planetary gear set,
    wherein the first planetary gear set is a single pinion planetary gear set including a first sun gear and a plurality of first pinion gears, and the second planetary gear set is a double pinion planetary gear including a second sun gear disposed coaxially and in parallel with the first sun gear, the plurality of first pinion gears shared with the first planetary gear set, and a plurality of second pinion gears; and
    a planet carrier having an exterior circumference connected to an external gear to receive a driving torque, where the planet carrier is connected to first and second pinion shafts that rotatably support the plurality of first pinion gears and the plurality of second pinion gears,
wherein:
    the plurality of first pinion gears are externally gear-meshed with the first sun gear of the first planetary gear set; and
    each second pinion gear of the plurality of second pinion gears is externally gear-meshed with adjacent two first pinion gears among the plurality of first pinion gears at the same time when externally gear-meshed with the second sun gear, and
wherein each first pinion gear of the plurality of first pinion gears comprises:
    a lame diameter gear portion externally gear-meshed with the first sun gear; and
    a small diameter gear portion externally gear-meshed with the second pinion gear.

2. The differential apparatus of claim 1, wherein the first and second sun gears have different exterior diameters.

3. The differential apparatus of claim 1, wherein the plurality of first pinion gears are provided as three first pinion gears, and the plurality of second pinion gears are provided as three second pinion gears.

4. The differential apparatus of claim 1, wherein the plurality of first pinion gears are provided as four first pinion gears, and the plurality of second pinion gears are provided as four second pinion gears.

5. The differential apparatus of claim 1, wherein the plurality of first pinion gears are provided as five first pinion gears, and the plurality of second pinion gears are provided as five second pinion gears.

6. The differential apparatus of claim 1, wherein the plurality of first pinion gears are provided as six first pinion gears, and the plurality of second pinion gears are provided as six second pinion gears.

7. The differential apparatus of claim 1, wherein a first driveshaft is connected to a rotation center of the first sun gear along a first direction, and a second driveshaft is connected to a rotation center of the second sun gear along a second direction opposite to the first direction.

* * * * *